C. H. REIDER.
CAR SEAT.
APPLICATION FILED NOV. 11, 1920.
1,369,543.
Patented Feb. 22, 1921.
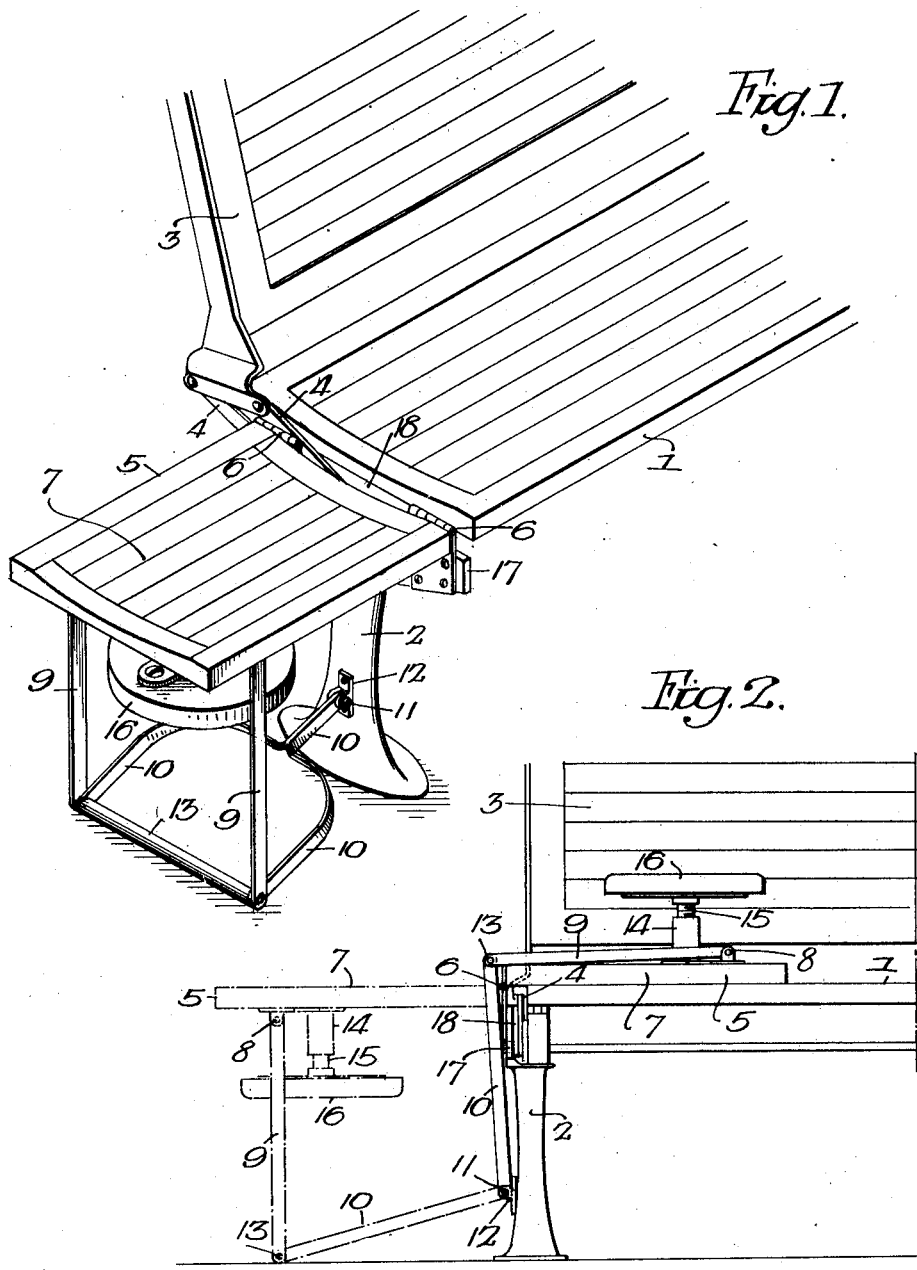
Inventor.—
Christian H. Reider.
by his Attorneys.

UNITED STATES PATENT OFFICE.

CHRISTIAN H. REIDER, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-SEAT.

1,369,543.    Specification of Letters Patent.    Patented Feb. 22, 1921.

Application filed November 11, 1920. Serial No. 423,243.

*To all whom it may concern:*

Be it known that I, CHRISTIAN H. REIDER, a citizen of the United States, residing in Philadelphia, Pennsylvania, have invented certain Improvements in Car-Seats, of which the following is a specification.

The object of my invention is to provide a seat, which can be attached to the ordinary trolley car seat, and which may be used by the motorman, or which can be turned down and occupied by a passenger. The seat is especially adapted for use in connection with trolley cars of the type known as "one-man" cars, where there is operating mechanism at each end of the car and where the motorman occupies either end of the car for driving the same.

In cars of this type, it is essential to leave as much space as possible for the passengers, and to provide a seat for the motorman. This is accomplished in the manner which I will now proceed to describe, reference being had to the accompanying drawings, in which:—

Figure 1 is a perspective view of a portion of a car seat, showing my improved motorman's seat in position to be occupied by a passenger; and Fig. 2 is a side view showing the seat in position to be occupied by a motorman.

1 is the seat section of a car seat. 2 is the aisle pedestal, which supports the seat. 3 is the back, which is connected to the pedestal by links 4 so that the back can be swung to either side of the car seat, according to the direction of movement of the car. This is the ordinary type of seat used in trolley cars.

5 is a seat section, which is pivotally connected to the pedestal 2 by hinges 6, the hinges being so located that the seat can be turned over so as to rest upon the seat section of the main car seat. The portion 7 is rectangular, in the present instance, and is shaped to correspond with the shape of the car seat and, when in the position illustrated in Fig. 1, forms a continuation of the main seat and extends into the aisle. Pivoted at 8 to the under side of the seat are links 9, which are connected to the arms of a yoke 10, which is pivoted at 11 to a bearing 12 secured to, or forming part of, the pedestal 2.

13 is a spacing bar located between the two arms of the yoke. This structure forms a rigid and firm support for the seat 7 of the seat section 5, when in the position illustrated in Fig. 1, and, when the seat is in the position illustrated in Fig. 2, the yoke rests close against the pedestal, while the links 9 extend over the seat.

14 is a socket secured to the under side of the seat section 7. In this socket, is a screw threaded opening to receive the screw-threaded spindle 15 of the motorman's seat 16, which is circular, in the present instance. On turning this seat section 16, it can be adjusted.

When the seat 5 is in the position illustrated in Fig. 1, the motorman's seat 16 is directly under the passenger seat 7, and out of the way, but, when the seat is turned to the position illustrated in Fig. 2, then it is in proper position to be used by the motorman so that when the motorman moves to one end of the car he turns up the seat 5 so as to bring the seat, which he occupies, in proper position to be used. This opens the aisle so that there is no obstruction. The seat at the opposite end of the car is turned down, as the entrance is at the forward end, and, as this is the last seat in the car, it does not interfere with the passengers.

When the motorman has finished a trip and goes to the opposite end of the car, he turns down the seat which he has occupied and turns up the corresponding seat at the opposite end of the car for his occupancy.

In order to allow the back 3 of the main seat to be moved to either side of the seat section 1, an extension 17 is provided on the outside of the pedestal 2 to which the hinges 6 are secured. This leaves a space 18 for the free movement of the arms 4 connecting the back to the pedestal.

I claim:

1. The combination of a car seat; a seat section pivoted at one side of the car seat; a motorman's seat under said seat section; and a support for the seat section so arranged that the said seat section can be turned over and upon the car seat with the motorman's seat in position to be occupied.

2. The combination of a car seat; a seat section pivoted at one end thereof; a pivoted yoke; links connecting the yoke to the seat section; and a motorman's seat located under the seat section, the parts being so proportioned that said seat section can be turned over onto the main car seat, exposing the motorman's seat for use, while the yoke is located at the side of the car seat.

3. The combination of a car seat; an aisle pedestal supporting the same; a movable back, which can be shifted from one side of the seat to the other; a seat section; hinges securing said seat section to the pedestal clear of the mechanism of the back; a yoke pivoted to the pedestal; links connecting the outer end of the yoke with the seat section; and a motorman's seat secured to the under side of the said seat section so that, when the said seat section is turned on its hinges, it will rest upon the car seat with the motorman's seat in position.

4. The combination of a car seat; a pedestal therefor; a movable back for said seat; links connecting the back to the pedestal so that the back can be moved to either side of the seat; an extension on the pedestal forming a space for the free movement of the links; a motorman's seat structure pivoted to said extension; and means for supporting the said seat structure when extended so as to form a continuation of the seat section of the main car seat and which will allow the said motorman's seat to be turned over onto the main seat so that it can be occupied by the motorman.

CHRISTIAN H. REIDER.